(12) United States Patent
Hooser

(10) Patent No.: US 7,566,191 B2
(45) Date of Patent: Jul. 28, 2009

(54) ERGONOMIC HANDLE FOR A HAND-HELD TOOL

(76) Inventor: Steven M. Hooser, 1417 Bilarda Ct., Geneva, IL (US) 60134

( * ) Notice: Subject to any disclaimer, the term of this patent is extended or adjusted under 35 U.S.C. 154(b) by 0 days.

(21) Appl. No.: 11/900,639

(22) Filed: Sep. 12, 2007

(65) Prior Publication Data

US 2009/0067935 A1    Mar. 12, 2009

(51) Int. Cl.
*B23D 71/04* (2006.01)
*B23D 71/00* (2006.01)

(52) U.S. Cl. ............ 407/29.15; 407/29.13; 407/29.1; 76/25.1; 16/110.1

(58) Field of Classification Search ........... 407/29.1, 407/29.13, 29.15; 16/110.1; 30/340, 342; 76/25.1, 36
See application file for complete search history.

(56) References Cited

U.S. PATENT DOCUMENTS

| | | | | | |
|---|---|---|---|---|---|
| 1,173,164 | A | * | 2/1916 | Berkman | 407/29.15 |
| 1,219,603 | A | * | 3/1917 | Stoltz | 76/50.4 |
| 1,323,899 | A | * | 12/1919 | Mullin | 407/29.15 |
| 1,980,087 | A | * | 11/1934 | Rast | 81/489 |
| 2,056,054 | A | * | 9/1936 | Osgood | 407/29.15 |
| 2,281,007 | A | * | 4/1942 | Bruno | 30/95 |
| 2,377,745 | A | * | 6/1945 | Belanger | 407/29.15 |
| 2,383,151 | A | * | 8/1945 | Orskog | 76/36 |
| 2,388,920 | A | * | 11/1945 | Jaynes | 407/29.15 |
| 2,816,351 | A | * | 12/1957 | Sauers | 407/29.1 |
| 2,975,505 | A | * | 3/1961 | Linskey et al. | 407/29.15 |
| 3,407,466 | A | * | 10/1968 | Granberg | 407/29.15 |
| 3,991,429 | A | * | 11/1976 | Honauer | 7/158 |
| 4,633,552 | A | * | 1/1987 | Eriksson | 407/29.15 |
| 4,663,993 | A | * | 5/1987 | Weninger et al. | 76/83 |
| 4,941,246 | A | * | 7/1990 | Finnegan | 407/29.15 |
| 5,762,344 | A | * | 6/1998 | Einvall | 279/96 |

* cited by examiner

*Primary Examiner*—Willmon Fridie
(74) *Attorney, Agent, or Firm*—Olson & Cepuritis, Ltd.

(57) ABSTRACT

An ergonomic handle for a hand-held tool, e.g., a chain saw sharpening file, is sized and shaped for cooperative engagement with the hand of a user and comprises an oblong, contoured body having a distal portion and a bulbous proximal portion integral therewith. A tool is received into a central opening that extends along the longitudinal axis of the oblong body.

21 Claims, 8 Drawing Sheets

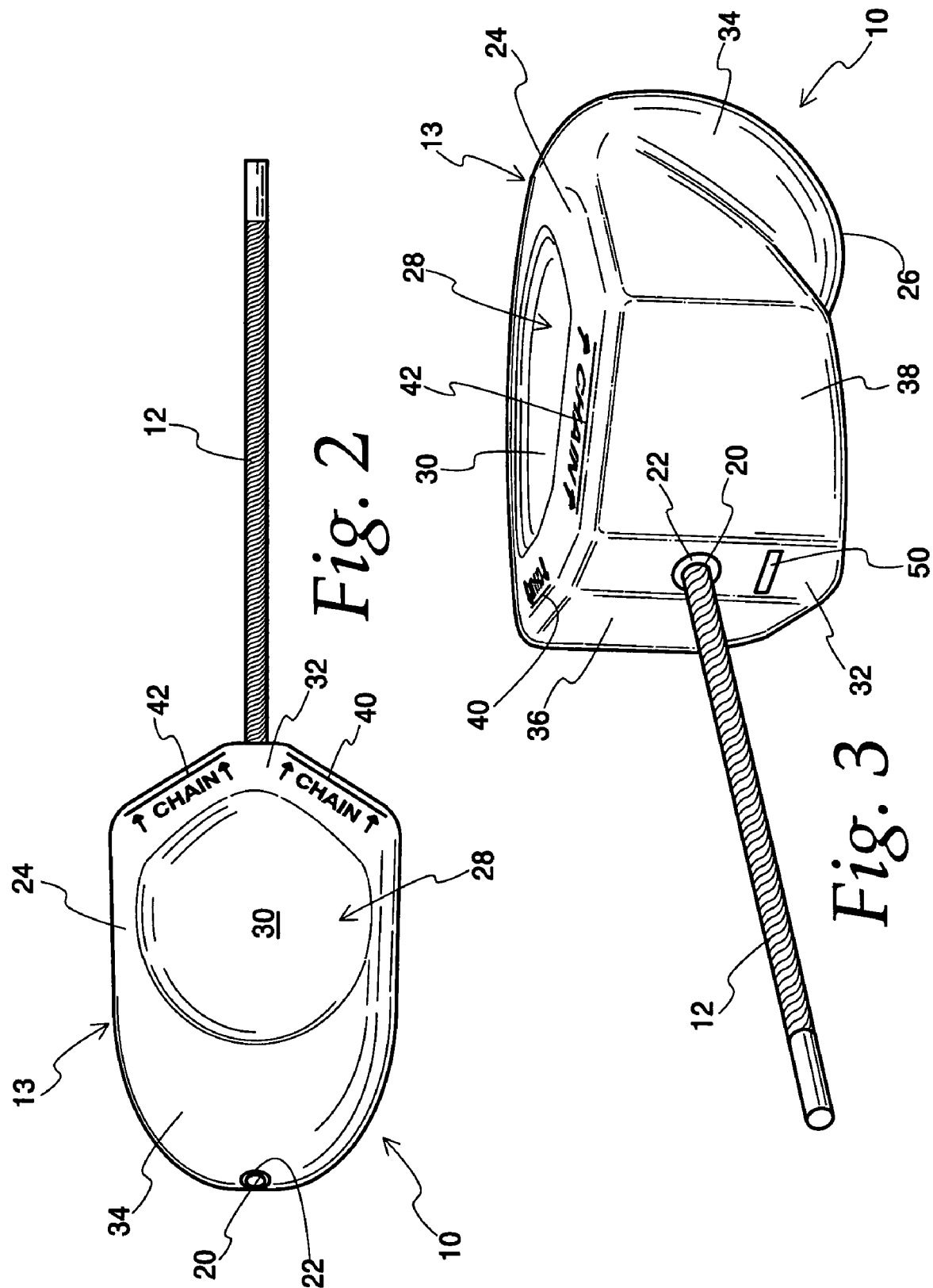

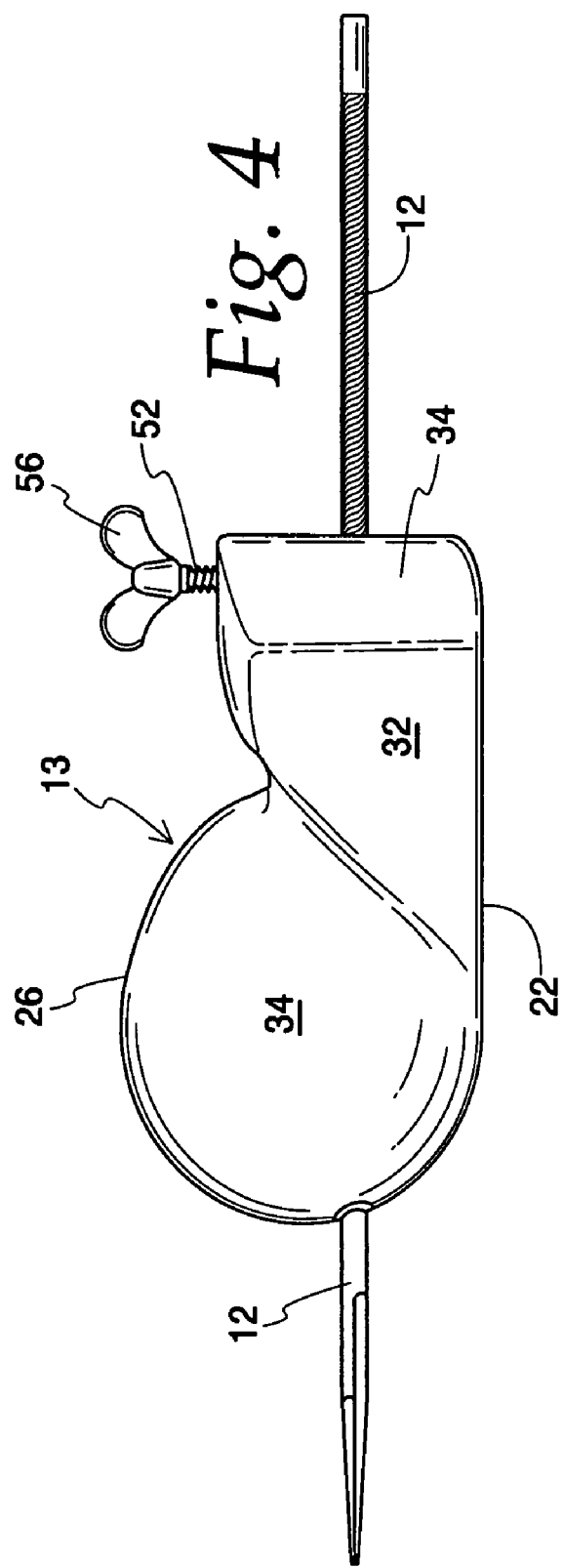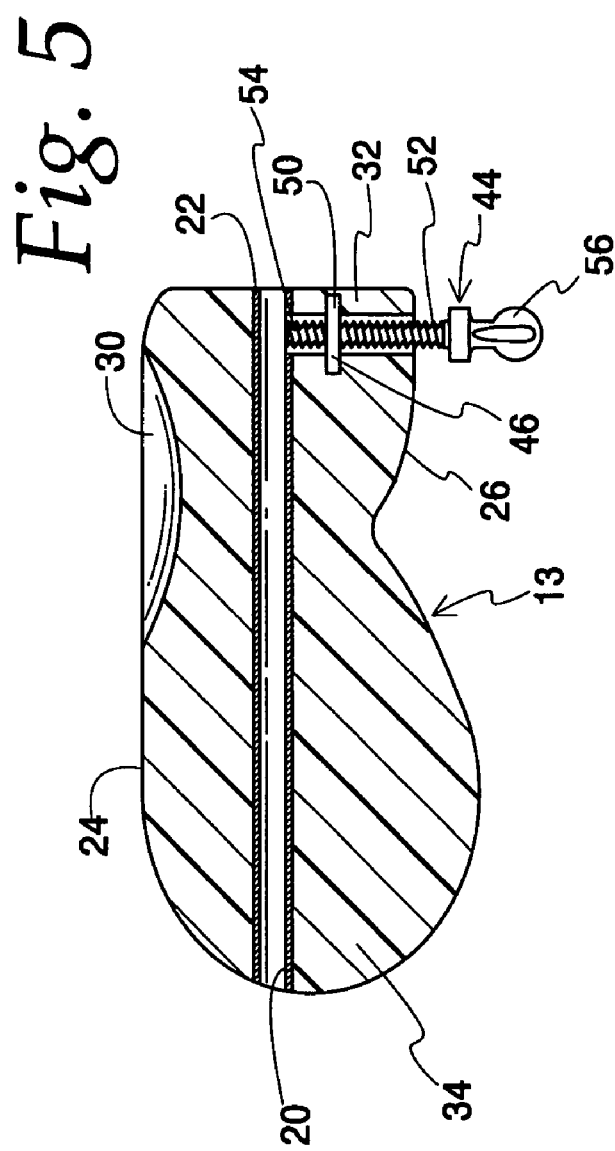

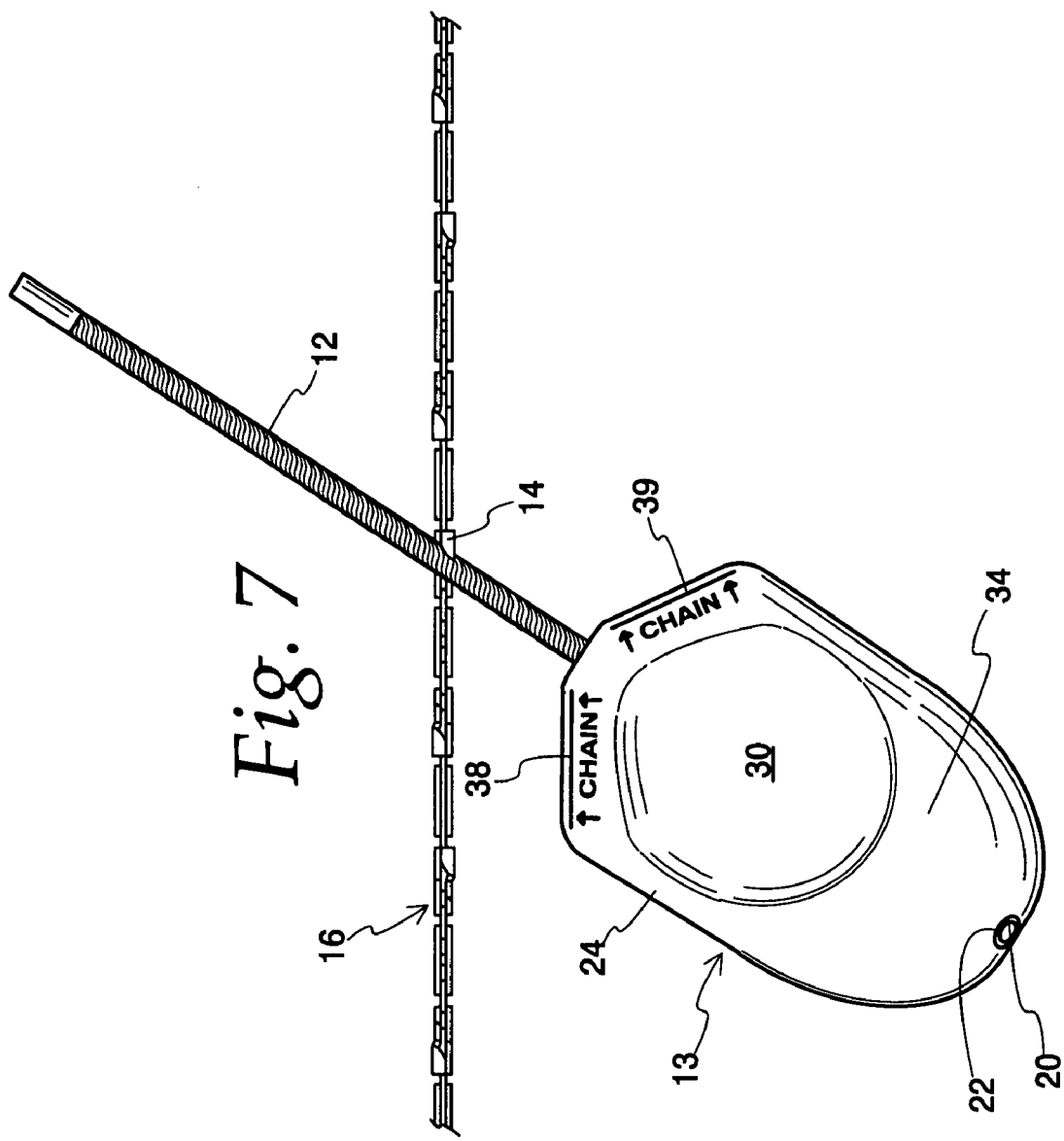
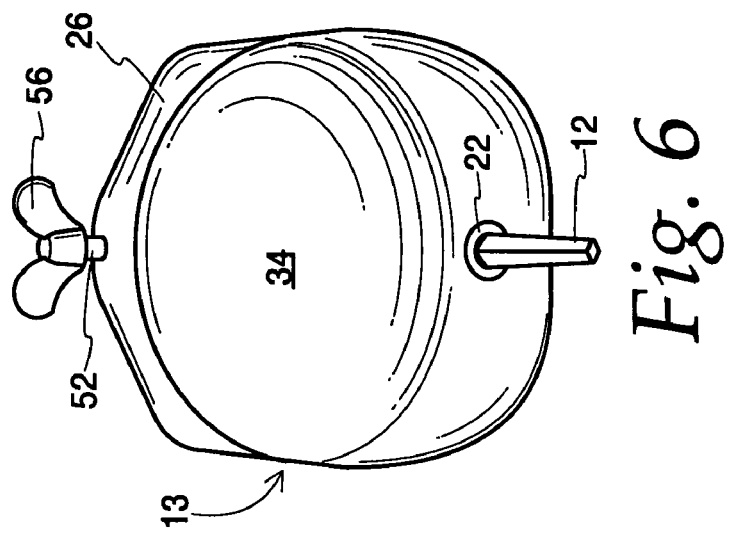

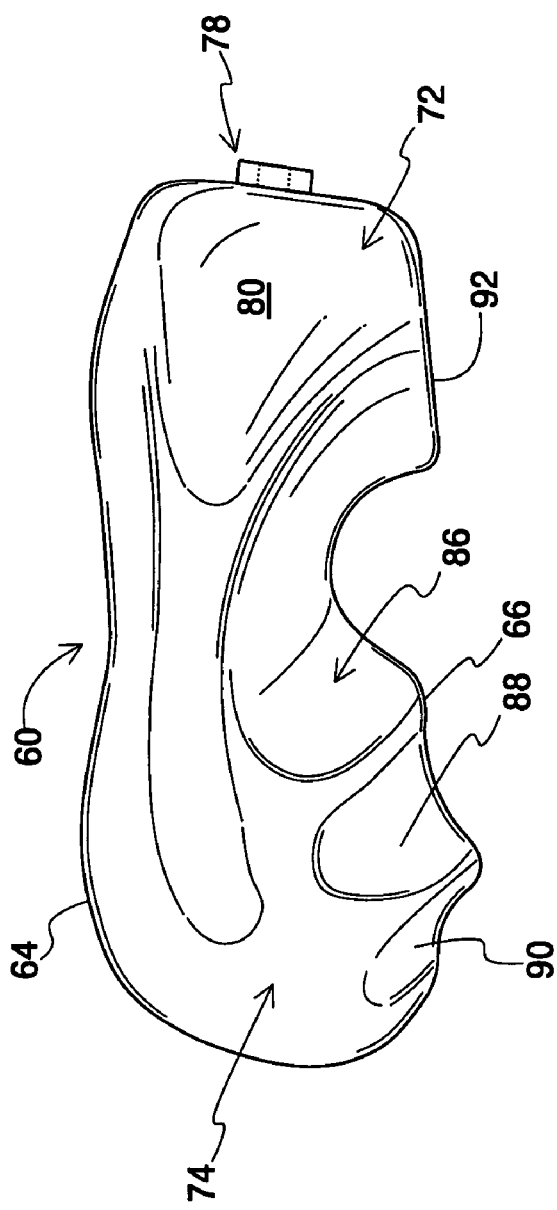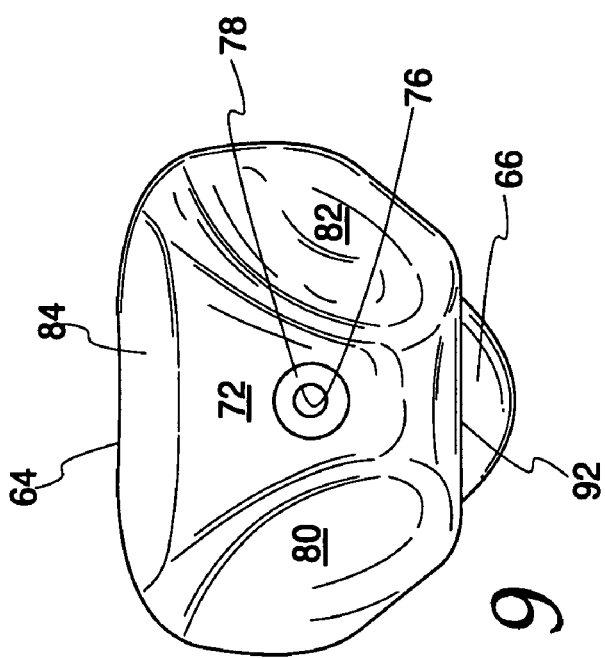
Fig. 8
Fig. 9

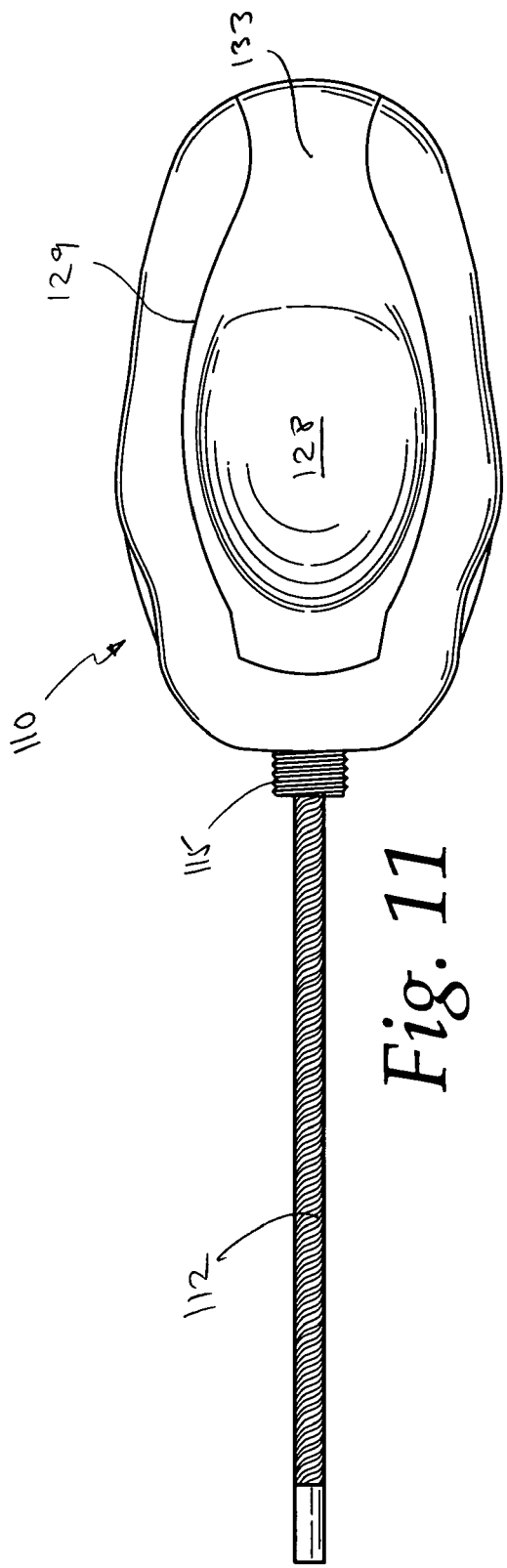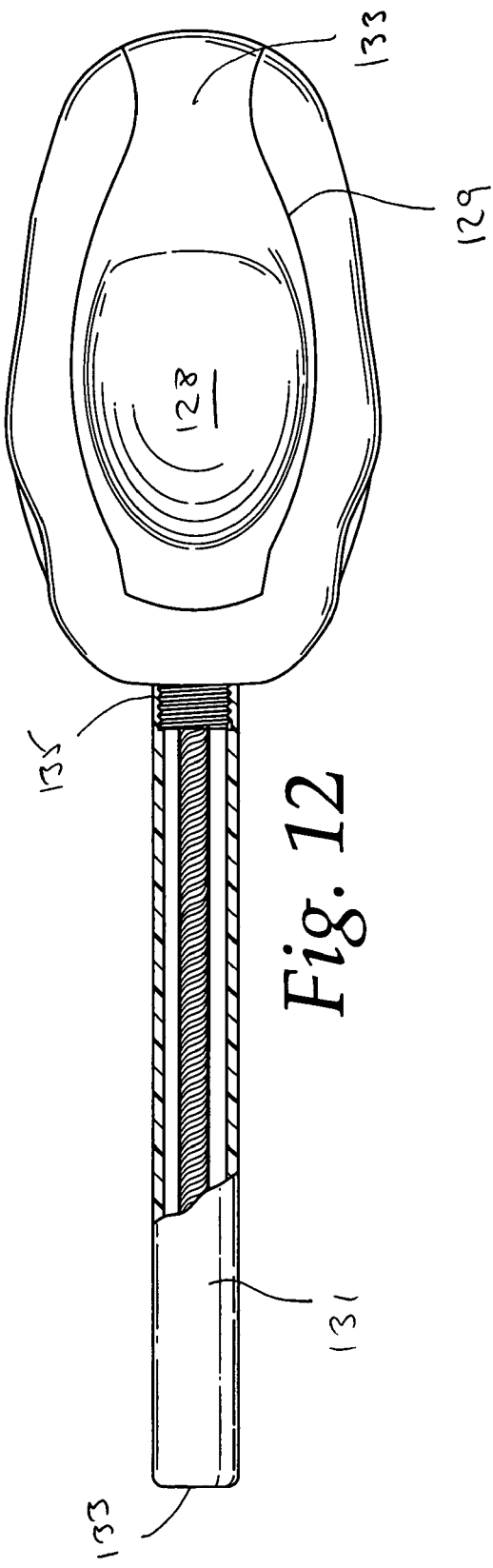

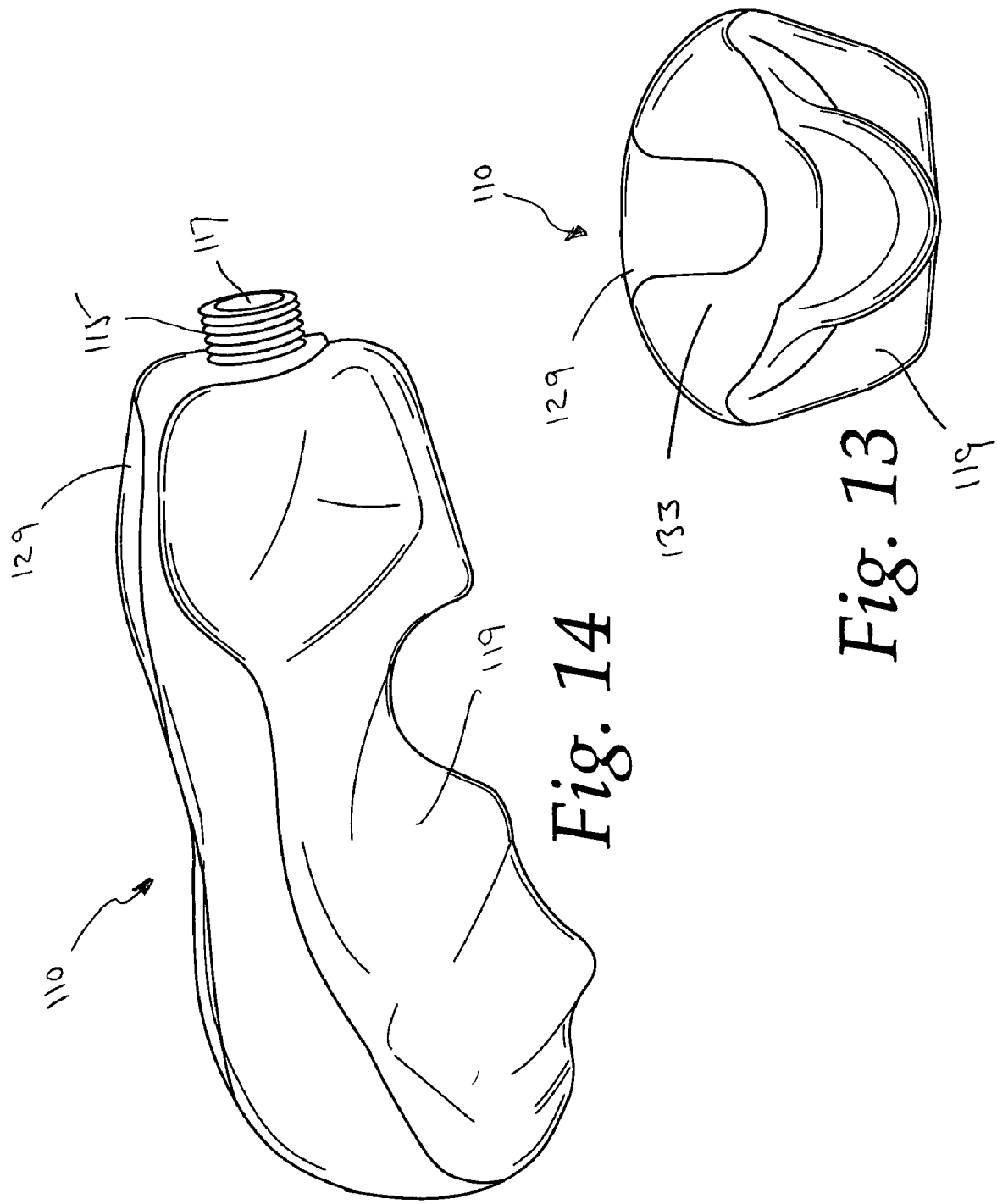

ERGONOMIC HANDLE FOR A HAND-HELD TOOL

FIELD OF INVENTION

This invention relates to ergonomic handles. More particularly, in a preferred embodiment this invention relates to file holders for saw sharpening files.

BACKGROUND OF THE INVENTION

Sharpness of a chain saw is important for cutting efficiency and for minimizing the likelihood of injuries that can be caused by snagging the chain because of dull cutting teeth. In moderate to heavy use, a chain saw may require sharpening at least once a day, sometimes more often.

While relatively large machines are available for the sharpening of saws and chains, such machines require the removal of the saw chain. Devices for sharpening a saw chain while the chain remains on the saw are available as well, but usually require a fixture to assist in the alignment of a hand file to the proper angle for sharpening each of the cutting teeth. The use of such fixtures is cumbersome and tiring to the user. Moreover, the repeated forward and backward movement of the file can lead to injuries such as carpal tunnel syndrome.

The present invention facilitates the hand sharpening of saw chains in the field by providing an ergonomic handle for the sharpening file that reduces fatigue and facilitates a more efficient sharpening operation.

SUMMARY OF THE INVENTION

The ergonomic handle suitable for a hand-held tool such as a chain sharpening file and like is sized and shaped for cooperative engagement with a user's hand and includes an oblong, contoured body that carries the tool when in use. The contoured body has an upper surface that defines a thumb rest, a lower surface, a longitudinal axis, and is sized to be received in the user's palm.

In a preferred embodiment for use with a chain sharpening file, the distal and proximal portions of the oblong, contoured body together define a central passageway which is sized to receive therewithin the file to be used for sharpening. The passageway can be a through passageway or a blind passageway, as desired. This central passageway extends along the longitudinal axis of the oblong body. A thumb rest is provided at the upper surface for a user's thumb. A locking device in the distal portion releasably secures a mid-portion of the file to the oblong, contoured body. In one embodiment, the distal portion defines a pair of angled front surfaces that are positioned at a predetermined angle, usually about 60 degrees with respect to the longitudinal axis and about 30 degrees with respect to the transverse axis. In another, preferred embodiment, an index finger rest is provided laterally from the central passageway on one or both sides thereof.

The proximal portion of the oblong, contoured body has a bulbous configuration and is sized to be received in the user's palm when the handle is grasped by the user. Optionally, gripping grooves are defined by the lower surface of the proximal portion.

The ergonomic handle embodying the present invention is bilateral and can be readily used by a right-handed user as well as a left-handed user.

The present ergonomic handle is particularly well suited for use with files, e.g., a chain saw sharpening file, but is also suitable for use with other hand-held tools such as chain saws, hand-held circular saws, and the like.

BRIEF DESCRIPTION OF THE DRAWINGS

In the FIGURES,

FIG. 2 is a plan view of the present ergonomic handle and a sharpening file mounted thereto;

FIG. 3 is a perspective view of the ergonomic handle shown in FIG. 2;

FIG. 4 is a side elevational view of an ergonomic handle embodying the present invention, having a sharpening file mounted thereto, and resting on its upper surface;

FIG. 5 is a side-elevational view in section along the longitudinal axis of the present ergonomic handle and showing one embodiment of a locking device used to retain a sharpening file within the handle during a sharpening operation;

FIG. 6 is an end perspective view of the present ergonomic handle illustrating the bulbous contour of the proximal portion;

FIG. 7 is a plan view of a sharpening file in use and equipped with an ergonomic handle that embodies the present invention;

FIG. 8 is a side elevational view of another ergonomic handle embodying the present invention;

FIG. 9 is a front elevational view of the ergonomic handle shown in FIG. 8;

FIG. 11 is a top view of yet another ergonomic handle embodying the present invention and mounted to a file;

FIG. 12 is a top view of the same ergonomic handle shown in FIG. 11 but showing a removable guard positioned over the file and removably attached to the handle;

FIG. 13 is an end view of the ergonomic handle shown in FIG. 11; and

FIG. 14 is a side view of the ergonomic handle shown in FIG. 11 with the file removed.

DESCRIPTION OF THE PREFERRED EMBODIMENTS

Figure 1:
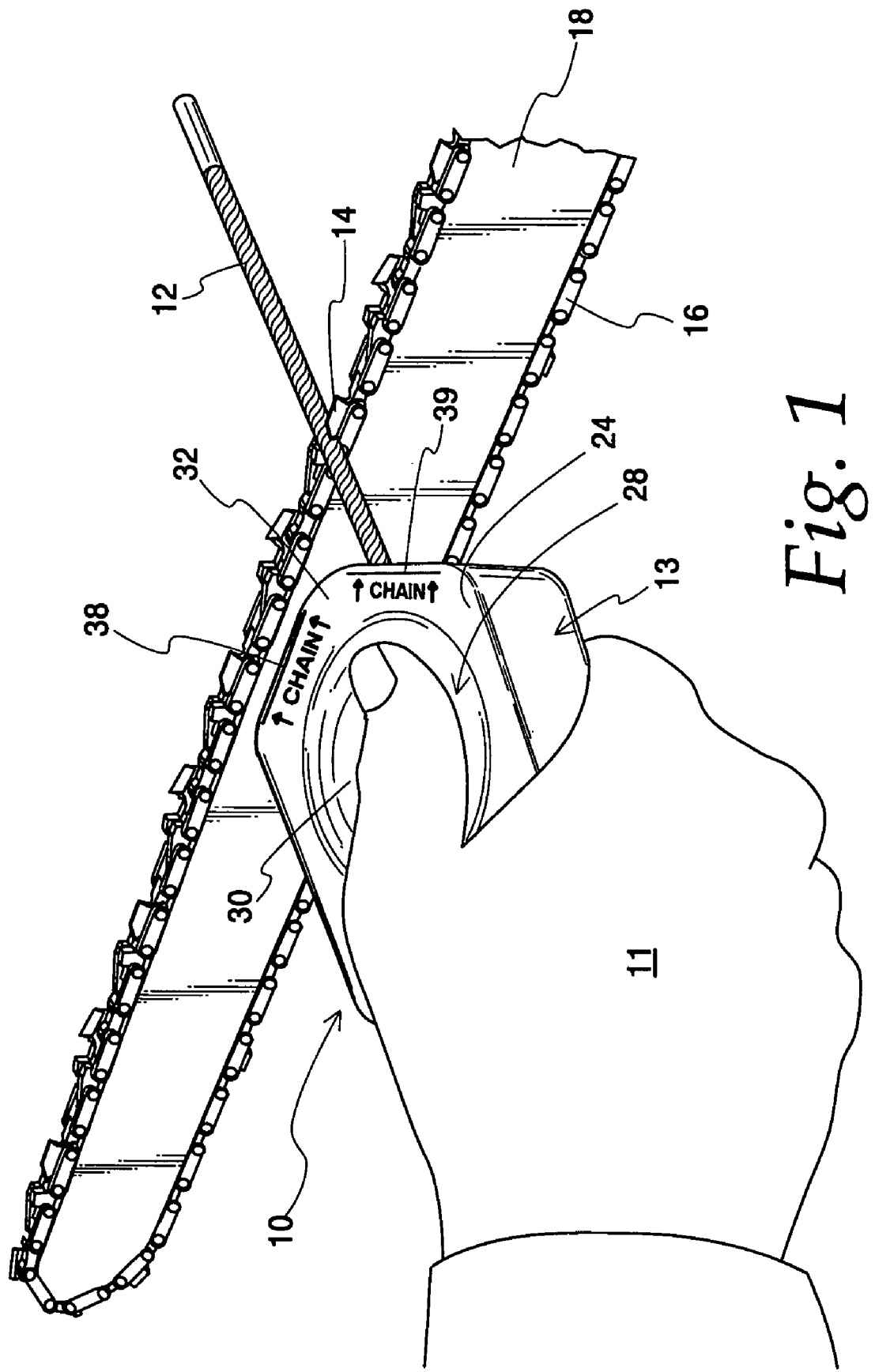
FIG. 1 is a perspective view illustrating the use of the present ergonomic handle by a right-handed user.

The invention disclosed herein can be embodied in several forms. Shown in the drawings and described herein below in detail are the preferred embodiments of the invention. It is to be understood, however, that the present disclosure is an exemplification of the principles of the invention and does not limit the invention to the illustrated embodiments.

For ease of description, devices embodying the present invention are described herein below in their usual positions as shown in the accompanying drawings and terms such as front, rear, upper, lower, top, bottom, inner, outer, horizontal, longitudinal, etc., may be used herein with reference to this usual position. However, these devices may be manufactured, transported, or sold in orientations other than that described and shown herein.

Referring to FIG. 1, ergonomic file handle 10 held in user's hand 11 is shown carrying file 12 that engages tooth 14 on saw chain 16 on chain support 18. As shown in FIGS. 2 and 3, saw chain file 12 is mounted to ergonomic handle 10 in a central through passageway 20 (FIG. 3) optionally lined with an elastomeric, e.g., neoprene, tubing segment 22. Passageway 20 is a through passageway that extends along the longitudinal axis of handle 10. Passageway 20 can also be a blind passageway, if desired.

Ergonomic handle 10 has an oblong, contoured body 13 having an upper surface 24, a lower surface 26, a thumb rest 28 such as cavity 30 in which the underside of the user's thumb can be received as depicted in FIG. 1. Alternatively, the thumb rest 28 can be a pad of non-skid material, an elastomeric material, or the like, on upper surface 24.

Distal portion 32 of handle 10 is integral with proximal portion 34, and can be unitary therewith, if desired. Whether or not distal portion 32 and proximal portion 34, or parts thereof, are integral or unitary depends to a large extent on fabrication expediencies. As best seen in FIGS. 3, 4 and 5, distal portion 32 is provided with a pair of angled surfaces 36, 38 positioned at a first, predetermined, included acute angle with respect to the longitudinal axis of handle 10 and a second, predetermined, included acute angle with respect to the transverse axis of the handle. The specific angles depend on the type of chain saw tooth to be sharpened. The first included acute angle usually is 60 degrees and the second, included acute angle usually is 30 degrees.

Distal portion 34 of handle 10 has a generally bulbous configuration sized to be grasped by a user's hand and received in a user's palm as shown in FIGS. 4, 5 and 6.

To facilitate proper alignment of file 12 with chain 16, markers 40, 42 can be provided on the upper surface 24 in distal portion 32 as shown in FIGS. 1, 2 and 3. Markers 40 and 42 are line segments parallel to respective planes 36 and 38, and are to be maintained aligned substantially parallel to saw chain 16 during sharpening, while file 12 contacts a chain tooth as shown in FIG. 7. Markers 40 and 42 can be printed on upper surface 24.

FIG. 5 also illustrates a locking device 44 in distal portion 32 that serves to releasably secure a mid-portion of a file to the oblong contoured body 13 of handle 10 when the file is received in central passageway 20. In this particular embodiment, the locking device 44 includes square nut 46 embedded into distal portion 32 through slot 50 and wing screw 52 threadedly engaging square nut 46 and having the distal end portion 54 thereof abutting central through passageway 20. Wings 56 of wing screw 52 can serve as a stabilizing support of ergonomic handle 10 when placed on a work surface such as a workbench, and the like. The locking device can also be a collar, preferably elastomeric, and apertured disc, an the like that frictionally but removably engages the file In use, an appropriate file, such as file 12, is mounted to handle 10 and secured in place by tightening wing screw 52 against the file prior to commencing the sharpening operation. The file portion projecting from handle 10 can be periodically extended or foreshortened with respect to the handle so as to present a sharp portion of the file to the tooth to be sharpened.

Figure 10:
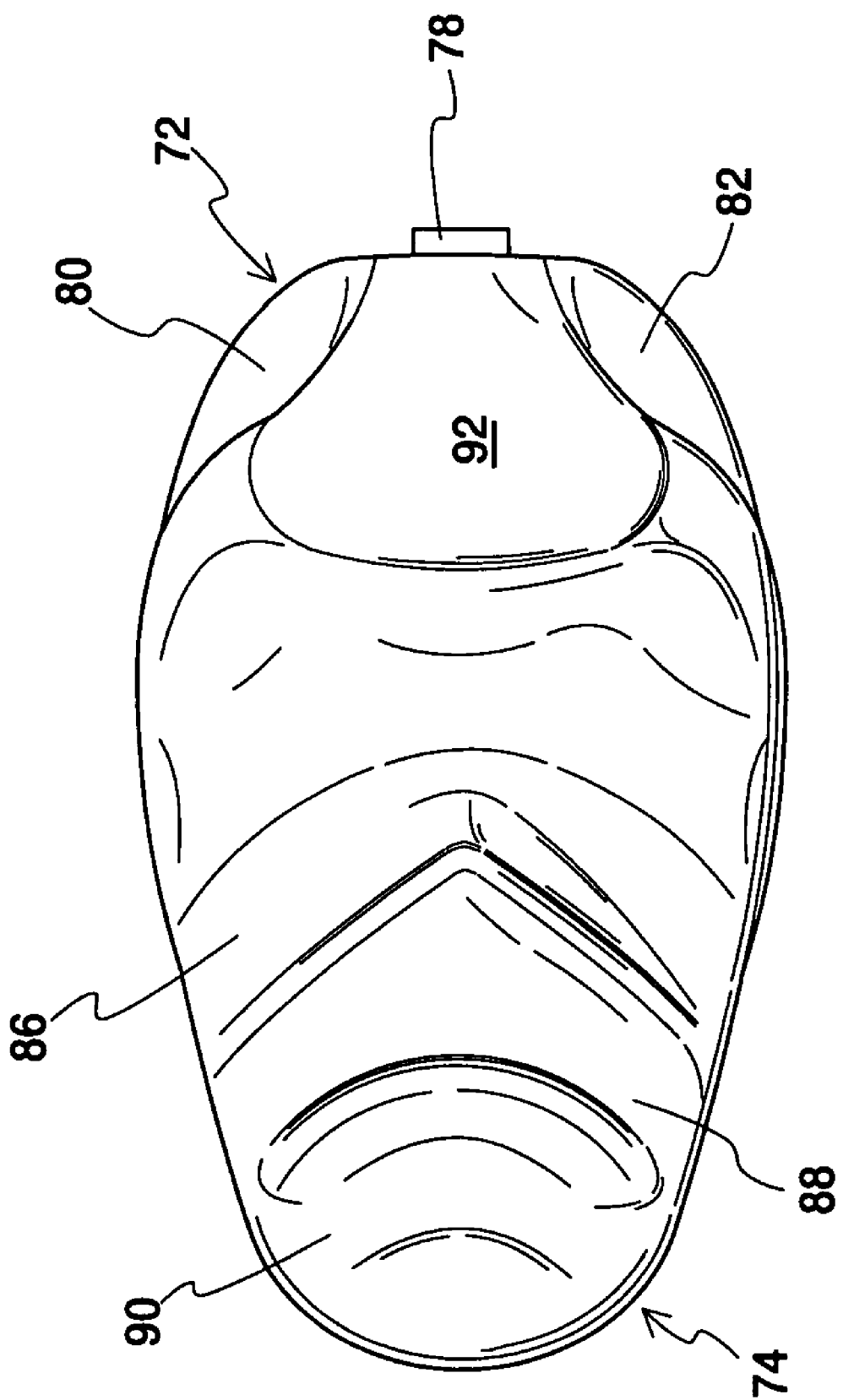
FIG. 10 is the underside view of the ergonomic handle shown in FIG. 8.

Another embodiment of the present invention is illustrated in FIGS. 8, 9 and 10. Ergonomic handle 60 has a contoured body 63 having an upper surface 64, a lower surface 66, a distal portion 72, and a bulbous proximal portion 74 unitary with the proximal portion 72.

Central passageway 76 in distal portion 72 is sized to receive a file and is provided with a locking device in the form of an apertured disk 78 with aperture thereof sized to receive a file in a frictional engagement therewith. As central passageway 76 shown in FIG. 9 is a blind passageway, but can be a through passageway if desired. Index finger rests 80 and 82 are defined by the distal portion 72 and are situated laterally from central passageway 76, i.e., on each side of central passageway 76. Thumb rest 84 is defined by upper surface 64. To further enhance grip on handle 60, gripping grooves 86, 88 and 90 are provided on the underside of the bulbous proximal portion 74 in lower surface 66. Preferably, the gripping grooves are symmetrical relative to the longitudinal axis of the ergonomic handle so as to accommodate the grip of a right-handed user as well as a left handed user.

Flat region or land 92 provides a support surface for ergonomic handle 60 when not in use.

Yet another embodiment of this invention is shown in FIGS. 11, 12, 13 and 14.

In particular, FIG. 11 shows ergonomic handle 110 with file 112 received in protruding, externally threaded boss 115 and frictionally but removably held therein. Thumb rest 128 is lined with an elastomeric upper inlay 129, preferably of a thermoplastic elastomer such as that commercially available under the designation VERSALLOY® from GLS Corporation, McHenry, Ill., USA. Upper inlay 129 also covers a portion of the dorsal region 133 of handle 110. The externally threaded boss 115 is adapted to receive a removable guard 131 which can be opaque or transparent, as desired. In the embodiment shown in FIG. 12, the removable guard 131 is tubular, having closed end 133 and open, internally threaded end 135.

As can be seen in FIGS. 13 and 14; another elastomeric inlay 119 covers the lower gripping surfaces of ergonomic handle 110. Inlay 119 preferably is made of the same material of construction as upper inlay 129. Aperture 117 is provided in boss 115 to receive and frictionally engage a hand-held tool such a file 112, a saw blade and the like.

The foregoing description and the accompanying drawings are to be taken as illustrative, but not limiting. Still other variants within the spirit and scope of this invention will readily present themselves to those skilled in the art.

I claim:

1. An ergonomic handle for a chain saw sharpening file, sized and shaped for cooperative engagement with a hand of a user, and comprising an oblong, contoured body having an upper surface, a lower surface, a longitudinal axis, a transverse axis, a thumb rest at the upper surface for user's thumb, a distal portion, and a proximal portion integral therewith, the distal and proximal portions together defining a central passageway sized to receive the file along the longitudinal axis;

a locking device in the distal portion for releasably securing a mid-portion of the file to the oblong, contoured body;

the proximal portion having a bulbous configuration sized to be received in user's palm; and wherein the central through passageway is a through passageway lined with a segment of an elastomeric tubing.

2. The ergonomic handle in accordance with claim 1 wherein the thumb rest is an oblong cavity in the upper surface sized to receive underside of user's thumb.

3. The ergonomic handle in accordance with claim 1 wherein the thumb rest is a pad of non-skid material.

4. The ergonomic handle in accordance with claim 1 wherein the locking device comprises a nut embedded in the distal portion, a wing screw threadedly engaged with the nut and having a distal end portion abutting the central through passageway.

5. The ergonomic handle in accordance with claim 1 wherein the locking device is an apertured disk sized for frictional engagement with the file.

6. The ergonomic handle in accordance with claim 1 wherein a chain alignment marker is provided on the upper surface parallel to each of said angled front surfaces.

7. An ergonomic handle for a chain saw sharpening file, sized and shaped for cooperative engagement with a hand of a user, and comprising an oblong, contoured body having an upper surface, a lower surface, a longitudinal axis, a transverse axis, a thumb rest at the upper surface for user's thumb, a distal portion, and a proximal portion integral therewith, the distal and proximal portions together defining a central through passageway sized to receive the file along the longitudinal axis;

a locking device in the distal portion for releasably securing a mid-portion of the file to the oblong, contoured body;

the distal portion further defining a pair of angled front surfaces, both positioned at a first predetermined, included acute angle with respect to the longitudinal axis and at a second predetermined, included acute angle with respect to the transverse axis;

the proximal portion having a bulbous configuration sized to be received in user's palm; and wherein the central through passageway is lined with a segment of an elastomeric tubing.

8. The ergonomic handle in accordance with claim 7 wherein the thumb rest is an oblong cavity in the upper surface sized to receive underside of users's thumb.

9. The ergonomic handle in accordance with claim 7 wherein the thumb rest is a pad of non-skid material.

10. The ergonomic handle in accordance with claim 7 wherein the locking device comprises a nut embedded in the distal portion, a wing screw threadedly engaged with the nut and having a distal end portion abutting the central through passageway.

11. The ergonomic handle in accordance with claim 7 wherein a chain alignment marker is provided on the upper surface parallel to each of said angled front surfaces.

12. An ergonomic handle for a chain saw sharpening file, sized and shaped for cooperative engagement with a hand of a user, and comprising an oblong, contoured body having an upper surface, a lower surface, a longitudinal axis, a thumb rest at the upper surface for user's thumb, a distal portion, and a proximal portion integral therewith, the distal and proximal portions together defining a central passageway sized to receive the file along the longitudinal axis;

a locking device in the distal portion for releasably securing a mid-portion of the file to the oblong, contoured body;

the distal portion further defining an index finger rest laterally from the central passageway;

the proximal portion having a bulbous configuration sized to be received in user's palm; and wherein the locking device comprises an apertured disk at proximal terminus of the central passageway and sized for frictional engagement with the file.

13. The ergonomic handle in accordance with claim 12 wherein the thumb rest is an oblong cavity in the upper surface sized to receive underside of user's thumb.

14. The ergonomic handle in accordance with claim 12 wherein the thumb rest is a pad of non-skid material.

15. The ergonomic handle in accordance with claim 12 wherein a chain alignment marker is provided on the upper surface parallel to each of said angled front surfaces.

16. The ergonomic handle in accordance with claim 12 wherein gripping grooves are defined by the lower surface of the proximal portion.

17. The ergonomic handle in accordance with claim 12 wherein the thumb rest is lined with an elastomeric inlay.

18. The ergonomic handle in accordance with claim 12 wherein the lower surface is covered with an elastomeric inlay.

19. An ergonomic handle for a chain saw sharpening file, sized and shaped for cooperative engagement with a hand of a user, and comprising an oblong, contoured body having an upper surface, a lower surface, a longitudinal axis, a thumb rest at the upper surface for user's thumb, a distal portion, and a proximal portion integral therewith, the distal and proximal portions together defining a central passageway sized to receive the file along the longitudinal axis;

a locking device in the distal portion for releasably securing a mid-portion of the file to the oblong, contoured body;

the distal portion further defining an index finger rest laterally from the central passageway;

the proximal portion having a bulbous configuration sized to be received in user's palm; and wherein a protruding externally threaded boss at the distal portion of the ergonomic handle surrounds the central passageway and is adapted to receive a guard for the file.

20. The ergonomic handle in accordance with claim 19 wherein a tubular guard for the file is threadedly engaged with said boss.

21. The ergonomic handle in accordance with claim 12 wherein the distal portion defines a pair of index finger rests laterally spaced from the longitudinal axis on opposite sides thereof.

* * * * *